(12) United States Patent
Schutz et al.

(10) Patent No.: US 7,655,606 B2
(45) Date of Patent: Feb. 2, 2010

(54) LUBRICANTS FOR SPORTS EQUIPMENT

(75) Inventors: Markus Schutz, Stuttgart (DE); Holger Bender, Backnang (DE)

(73) Assignee: Holmenkol AG, Ditzingen-Heimerdingen (DE)

( * ) Notice: Subject to any disclaimer, the term of this patent is extended or adjusted under 35 U.S.C. 154(b) by 505 days.

(21) Appl. No.: 11/202,652

(22) Filed: Aug. 12, 2005

(65) Prior Publication Data

US 2006/0052258 A1    Mar. 9, 2006

(30) Foreign Application Priority Data

Aug. 13, 2004    (DE) .................. 10 2004 039 381

(51) Int. Cl.
*C10M 159/06*    (2006.01)
*C09G 3/00*    (2006.01)

(52) U.S. Cl. ...................... 508/451; 508/590

(58) Field of Classification Search ............. 508/451, 508/590, 118, 131
See application file for complete search history.

(56) References Cited

U.S. PATENT DOCUMENTS 4,655,944 A * 4/1987 Mori ...................... 428/545
4,666,762 A * 5/1987 Yamamoto ............... 428/216
4,711,949 A * 12/1987 Aramaki et al. ........... 525/356
6,566,442 B2 * 5/2003 Abusleme et al. ......... 524/570

FOREIGN PATENT DOCUMENTS

| DE | 33 43 697 A1 | 6/1984 |
| DE | 35 20 068 A1 | 12/1985 |
| EP | 0 444 752 B1 | 11/1998 |
| WO | WO 97/27004 | 7/1997 |
| WO | WO 01/44306 A2 | 6/2001 |
| WO | WO 2004/092291 A1 | 10/2004 |

OTHER PUBLICATIONS

"Production and Study of the Physical Properties of Composites of a System Consisting of Polychlorotrifluoro-ethylene and Dispersed High-Temperature Superconductor $Ti_2Ba_2Ca_2Cu_3O_y$,", L.K. Yanchevskii, et al., International Polymer Science and Technology, vol. 25, No. 5, 1998, pp. T/50-T/55.

* cited by examiner

*Primary Examiner*—Walter D Griffin
*Assistant Examiner*—Frank C Campanell
(74) *Attorney, Agent, or Firm*—Perman & Green LLP

(57) ABSTRACT

The invention relates to polychlorotrifluoroethylenes (PCTFE) for improving the gliding properties of sports equipment and, in particular, winter sports equipment, to compositions containing the same, and to their use for this purpose. The polychlorotrifluoroethylenes are, in particular, polychlorotrifluoroethylenes which have a molecular weight selected so that they have a pourpoint in the range from −70° C. to 200° C. (−94° F. to 392° F.), and preferably from 0° C. to 100° C. (32 to 212° F.).

37 Claims, No Drawings

LUBRICANTS FOR SPORTS EQUIPMENT

CROSS-REFERENCE TO RELATED APPLICATIONS

This application claims priority from German Patent Application No. 10 2004 039 381.8, filed on Aug. 13, 2004.

The invention relates to agents for improving the gliding properties of sports equipment, for example winter sports equipment, such as skis, compositions which contain the same, and to their use for this purpose. More particularly, it relates to polychlorotrifluoroethylenes (PCTFE) as lubricants.

Not only in professional sports, but also in the case of ambitious amateurs there is a constant need for lubricants which can still improve the gliding effects of sports equipment, such as skis, by reducing the sliding friction and which lead, e.g., to even higher top speeds and to an even better acceleration. Moreover, if they have better gliding properties sports equipments such as skis are easier to control.

In the prior art there were already proposed numerous materials for improving the gliding properties of sports equipment, such as cross-country skis, alpine skis, and snowboards. These materials are usually paraffin waxes and fluorinated waxes or fluorinated polymers, which can also contain additives.

In publication EP 1 009 544, e.g., non-functional, liquid perfluoro-polyethers were proposed as lubricants for skis, which are liquid at ambient temperature and which have a pourpoint below 5° C. (41° F.). In publication EP 0 444 752 compositions for improving the gliding properties of skis are indicated which comprise wax-like two-block copolymers, one block consisting of perfluorinated polyethylene and the other block of polyethylene. In comparison with polytetrafluoroethylene powders these two-block copolymers are considerably more compatible with wax and can, therefore, easier be mixed into conventional paraffin waxes, their compatibility, however, not being completely satisfactory. Moreover, these compounds have the disadvantage that they are very expensive.

The gliding surfaces of winter sports articles usually consist of sintered thermoplasts, in particular polyethylene, having a very high density and a high molecular weight, such as UHWPE, or of extruded polymers.

The object of the present invention resides in providing a lubricant for still improving the gliding properties of sports equipment and, in particular winter sports equipment, which can be used universally, i.e. over a wide temperature range and at most various weather conditions, and, moreover, which is easy to apply and well adheres to the base, e.g. a ski sole; furthermore, it should be inexpensive.

The invention therefore relates to polychlorotrifluoroethylenes of the following general formula:

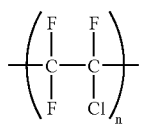

wherein n is selected in such a way that the compounds are liquid, wax-like or solid at ambient temperature and have a pourpoint in the range from −70° C. to 200° C. (−94° F. to 392° F.), and particularly from 0 to 100° C. (32 to 212° F.).

Particularly preferably use is made of compounds which are in a wax-like state at room temperature and which have a pourpoint from 45 to 65° C. (113 to 149° F.), or compounds which are solid and have a pourpoint>70° C. (>158° F.).

The value of n is preferably selected in such a way that that the molar mass of PCTFE lies in the range of 500 to 5,000 and, in particular in the range of 1,000 to 2,000.

The molecular weight of the compounds is preferably selected in such a way that the compounds are easy to process in the respective fields of application which approximately lie in the range from −20° C. to 30° C. (−4° F. to 86° F.) depending on whether the sports equipment is a winter sports article or, for example, a water sports article such as a boat, water skis and the like, which are preferably used in summer at higher temperatures.

Easy to process means that they can either be applied in liquid form directly by rubbing them onto the respective surface with, e.g., a cloth or sponge, or by spraying them as aerosols, or that they—in the case of the wax-like compounds—are still softenable at higher temperatures, i.e. in particular at temperatures from 100° C. to 160° C. (212 to 320° F.), so that they, as it is common for ski waxes, can be applied by the use of heat, e.g., with an iron. The solid polymers can also be used in powder form in a mixture with conventional paraffin waxes and/or fluorinated waxes.

According to the invention the term 'polychlorotrifluoroethylene(s)' does not only mean homopolymers, but also copolymers which, in addition to the chlorotrifluoroethylene units contain further units, e.g. units of ethylene, propylene, and/or tetrafluoroethylene. These can, for example, be block copolymers, such as two-block or three-block copolymers, which—apart from one or a plurality of polychlorotrifluoroethylene blocks—also contain one or more other blocks, e.g. polyethylene blocks, polypropylene blocks, and/or polytetrafluoroethylene blocks. The copolymers can also be grafted or they can be alternating copolymers.

However, according to the invention, preferably PCTFE homopolymers are used.

The polychlorotrifluoroethylene homopolymers of the present invention can well be mixed with paraffin waxes and fluor waxes, which are, at present, conventionally used as lubricants for the above-indicated fields of application.

The polymers according to the invention can be employed universally. The liquid polymers as well as the solid waxes can be applied in pure form onto the surface of the respective sports article without heating being necessary. If necessary, the can, e.g., be applied with a cloth or sponge directly to the surface.

However, the polymers according to the invention can, e.g., also be sprayed onto the sports article as aerosols, e.g., by using an aerosol container or a pump bottle. If the polymers are viscous or rather wax-like and have a relatively high molecular weight, they can also be used in combination with solvents, if this is desired. Suitable solvents are, for example, aliphatic or aromatic hydrocarbons, such as ISOPARs, isopropanol, or silicone oils.

The lubricants according to the invention can be applied in pure form, they can, however, also contain additives, for example substances which modify the viscosity, such as solvents, and can be used in a mixture with further lubricants, where appropriate.

They can also be worked in into lubricants which are conventionally used for winter sports equipment, such as paraffin waxes or fluorinated waxes, or they can be introduced, e.g. in the case of boat coatings, into the varnish matrix used for the coating.

There can be used, e.g., compositions which, in combination with the polymers according to the invention, contain 0.1 to 99 wt. -% conventional paraffin waxes and/or fluorinated waxes. The PCTFE homopolymers or PCTFE copolymers according to the invention preferably account for about 0.1 to 30 wt.-%, more preferably for 1 to 15 wt.-%, and most preferably for 1 to 10 wt.-% of the overall weight of the lubricant. Surprisingly, it turned out that conventional paraffin waxes and/or fluor waxes which contain the PCTFE polymers according to the invention in the mixture yield significantly better gliding properties on snow than do the known paraffin waxes and/or fluor waxes alone.

According to a preferred embodiment, a powdery polychlorotrifluoroethylene being solid at ambient temperature and having a pourpoint>70° C. (>158° F.) is used in combination with conventional paraffin waxes and/or fluorinated waxes.

Furthermore, according to the invention it is also possible to apply the polychlorotrifluoroethylenes onto a conventional ski wax film, i.e. a lubricant layer serving as a base wax. The PCTFE polymers according to the invention can, however, also be directly applied to the gliding surface without a base wax being applied beforehand.

According to a further special embodiment, first a polychlorotrifluoroethylene according to the invention is directly applied to the ski sole, and subsequently a further conventional lubricant, e.g. a fluorinated wax or paraffin wax, is applied. In this way not only the gliding properties can be improved, but also the abrasion resistance of the lubricant can be increased and the adhesion can be improved, so that the lubricant must only be reapplied at times.

According to the invention it is further possible to apply the polychlorotrifluoroethylenes onto a conventional ski wax film, i.e. onto a lubricant layer serving as a base wax.

According to the invention preferably those polychlorotrifluoroethylene homopolymers are used which have a wax-like consistence and a pourpoint in the range from 45° C. to 65° C. (113 to 149° F.).

Of course, the polychlorotrifluoroethylenes can be used individually or as a mixture of a plurality of polychlorotrifluoroethylenes, in particular polychlorotrifluoroethylenes which have different pourpoints, for example a combination of a liquid polychlorotrifluoroethylene and a wax-like and/or solid polychlorotrifluoroethylene.

The polychlorotrifluoroethylenes according to the invention can improve the gliding properties of the most various sports articles. As examples in particular skis, cross-country skis, snowboards, sleds, boats, surfboards, waterskis, sailplanes, paragliders or ultralights can be mentioned.

In the following an example is given for explaining the invention in more detail.

EXAMPLE

This example shows the improvement of the gliding properties, which can be achieved with a lubricant composition according to the invention as compared to lubricants of the prior art.

Identical skating skis were first subjected to a basic treatment with Betamix Worldcup RED of the company Holmenkol. For this purpose the wax was melted onto the ski sole by using a wax iron, scraped off with a plastic scraper, and then brushed. Betamix Worldcup RED is a paraffin wax without fluorinated components.

Then, on this base, the following wax mixtures were applied:

Test Mixture A: base wax on the basis of paraffin (Power Pack Alpha of the company Holmenkol), into which 6.5 wt.-% of a commercially available mixture of perfluoroalkylhexadecanes (two-block polymer, partially fluorinated alkane) were worked in, Test Mixture B (according to the invention): base wax on the basis of paraffin (Power Pack Alpha of the company Holmenkol) into which 6.5 wt.-% of a polychlorotrifluoroethylene wax (pourpoint 45-65° C. (113 to 149° F.), density at 100° C. (212° F.) 1.970-1.99, viscosity at 100° C. (212° F.) 80-420 cst) were worked in, H7 Yellow of the company Briko (product containing perfluoroalkane).

In the case of all skis the wax was applied by means of a wax iron, then the excess wax was scraped off with a plastic scraper and thereupon the ski sole was brushed with a Steel-Micro Finish Brush.

The test was made on a prepared sloping trail. The times were detected by a light barrier. Per pair of skis alternatingly three test runs were made, respectively, and all runs were made by the same skier.

Conditions during the test:
weather: bright, no precipitation
air temperature: 3.3° C. (37.94° F.)
snow temperature: −0.4° C. (31.28° F.)
atmospheric humidity: 70.5%
type of snow old snow coarse
trail: wet soft The result is summarized in the following Table, from the detected times the mean value having been calculated, respectively.

|  | mean value [s] | distance [%] |
| --- | --- | --- |
| Test Mixture A | 8.03 | 1.39% |
| Test Mixture B | 7.92 | — |
| H7 Yellow | 7.97 | 0.63% |

The skis waxed with the Text Mixture B according to the invention (polychlorotrifluoroethylene mixture) were faster by about 1.39% than those waxed with Test Mixture A (mixture of perfluoroalkylhexadecanes), and faster by about 0.63% than the skis waxed with H7 Yellow from the company Briko.

The invention claimed is:

1. Use of one or several polychlorotrifluoroethylenes (PCTFE) for the improvement of the gliding properties of sports equipment, comprising:
   providing a lubricant for sports equipment containing one or several polychlorotrifluoroethylenes and further comprising one or several paraffin waxes, and/or one or several fluor waxes, and/or one or several solvents; and
   applying said lubricant onto the surface of the respective sports equipment.

2. Use according to claim 1, wherein the sports equipment is selected from boats, surfboards, water skis, sailplanes, paragliders, ultralights, winter sports equipment or canvas.

3. Use according to claim 2 for the improvement of the gliding properties of winter sports equipment on snow, said lubricant being applied to the non-pretreated sole of a winter sports article or to the sole of a winter sports article pretreated with a second lubricant.

4. Use according to claim 1, wherein the lubricant comprises 1 to 30 wt.-% of one or several polychlorotrifluoroethylenes in a mixture with one or several paraffin waxes and/or fluor waxes.

5. Use according to claim 1, wherein the polychlorotrifluoroethylene has a molecular weight which is selected in such a way that it has a pour point in the range from −70° C. to 200° C. (−94 to 392° F.).

6. Use according to claim 1, wherein the polychlorotrifluoroethylene has a molecular weight which is selected in such a way that it has a pour point from 45° C. to 65° C. (113 to 149° F.).

7. Use according to claim 1, wherein the polychlorotrifluoroethylene is solid at ambient temperature and has a pour point>70° C. (158° F.).

8. Use according to claim 1, wherein the polychlorotrifluoroethylene is a polychlorotrifluoroethylene homopolymer.

9. Use according to claim 1, wherein the polychlorotrifluoroethylene is a polychlorotrifluoroethylene block copolymer which comprises one or several polychlorotrifluoroethylene blocks and one or several polyethylene blocks, polypropylene blocks or polytetrafluoroethylene blocks.

10. A lubricant for sports equipment containing:
one or several polychlorotrifluoroethylenes, and one or a mixture of:
a) one or several fluor waxes; and/or
b) one or several paraffin waxes.

11. Lubricant according to claim 10, wherein the substances which modify the viscosity are solvents.

12. Lubricant according to claim 10, wherein it comprises 1 to 30 wt.-% of one or several polychlorotrifluoroethylenes.

13. Lubricant according to claim 10, wherein it comprises 1 to 15 wt.-% of one or several polychlorotrifluoroethylenes.

14. Lubricant according to claim 10, wherein it comprises 1 to 10 wt.-% of one or several polychlorotrifluoroethylenes.

15. Lubricant according to claim 10, wherein the polychlorotrifluoroethylene has a molecular weight which is selected in such a way that it has a pour point in the range from −70° C. (−94 to 392° F.).

16. Lubricant according to claim 10, wherein the polychlorotrifluoroethylene has a molecular weight which is selected in such a way that it has a pour point from 45° C. to 65° C. (113 to 149° F.).

17. Lubricant according to claim 10, wherein the polychlorotrifluoroethylene is solid at ambient temperature and has a pourpoint>70° C. (158° F.).

18. Lubricant according to claim 10, wherein the polychlorotrifluoroethylene is a polychlorotrifluoroethylene homopolymer.

19. Lubricant according to claim 10, wherein the polychlorotrifluoroethylene is a polychlorotrifluoroethylene block copolymer which comprises one or several polychlorotrifluoroethylene blocks and one or several polyethylene blocks, polypropylene blocks or polychlorotrifluoroethylene blocks.

20. The use of claim 3 wherein the second lubricant comprises a paraffin wax and/or a fluor wax.

21. The use of claim 4 wherein the mixture includes one or more viscosity modifiers.

22. Use of one or several polychlorotrifluoroethylenes (PCTFE) for the improvement of the gliding properties of sports equipment, comprising:
providing a lubricant for sports equipment consisting of one or several polychlorotrifluoroethylenes, the polychlorotrifluoroethylene having a molecular weight which is selected in such a way that it has a pour point in the range from −70° C. to 200° C. (−94 to 392° F.); and
applying said lubricant onto the surface of the respective sports equipment.

23. The use according to claim 22, wherein the sports equipment is selected from boats, surfboards, water skis, sailplanes, paragliders, ultralights, winter sports equipment or canvas.

24. use according to claim 23 for the improvement of the gliding properties of winter sports equipment on snow, said lubricant being applied to the non-pretreated sole of a winter sports article or to the sole of a winter sports article pretreated with a further lubricant.

25. Use according to claim 22 for the improvement of the gliding properties of winter sports equipment on snow, said lubricant being applied to the non-pretreated sole of a winter sports article or to the sole of a winter sports article pretreated with a further lubricant.

26. use according to claim 22, wherein the lubricant comprises 1 to 30 wt.-% of one or several polychlorotrifluoroethylenes.

27. Use according to claim 22, wherein the polychlorotrifluoroethylene has a molecular weight which is selected in such a way that it has a pour point from 45° C. to 65° C. (113 to 149° F.).

28. Use according to claim 22, wherein the polychlorotrifluoroethylene is solid at ambient temperature and has a pour point>70° C. (158° F.).

29. Use according to claim 22, wherein the polychlorotrifluoroethylene is a polychlorotrifluoroethylene homopolymer.

30. Use according to claim 22, wherein the polychlorotrifluoroethylene is a polychlorotrifluoroethylene block copolymer which comprises one or several polychlorotrifluoroethylene blocks and one or several polyethylene blocks, polypropylene blocks or polychlorotrifluoroethylene blocks.

31. A lubricant for sports equipment comprising:
−1 to 30 wt.-% of one or several polychlorotrifluoroethylenes, and;
a) one or several paraffin waxes; and/or
b) one or several substances which modify the viscosity.

32. Lubricant according to claim 31, wherein it comprises 1 to 15 wt.-% of one or several polychlorotrifluoroethylenes.

33. Lubricant according to claim 31, wherein it comprises 1 to 10 wt.-% of one or several polychlorotrifluoroethylenes.

34. Lubricant according to claim 31, wherein the polychlorotrifluoroethylene is a polychlorotrifluoroethylene homopolymer.

35. Lubricant according to claim 31, wherein the polychlorotrifluoroethylene is a polychlorotrifluoroethylene block copolymer which comprises one or several polychlorotrifluoroethylene blocks and one or several polyethylene blocks, polypropylene blocks or polychlorotrifluoroethylene blocks.

36. Lubricant according to claim 10, further comprising one or several substances which modify the viscosity.

37. The lubricant of claim 31 further comprising that the polychlorotrifluoroethylene has a molecular weight which is selected in such a way that it has a pour point from 45° C. to 65° C. (113 to 149° F.).

* * * * *

UNITED STATES PATENT AND TRADEMARK OFFICE
CERTIFICATE OF CORRECTION

| | | |
|---|---|---|
| PATENT NO. | : 7,655,606 B2 | Page 1 of 1 |
| APPLICATION NO. | : 11/202652 | |
| DATED | : February 2, 2010 | |
| INVENTOR(S) | : Markus Schutz | |

It is certified that error appears in the above-identified patent and that said Letters Patent is hereby corrected as shown below:

Column 5, line 38-39, in Claim 15, after "-70° C." insert --to 200° C.--.

Column 5, line 54, in Claim 19, delete "polychlorotrifluoroethylene" and insert --polytetrafluoroethylene--, therefor.

Column 6, line 10, in Claim 24, before "use" insert --The--.

Column 6, line 20, in Claim 26, delete "use" and insert --Use--, therefor.

Column 6, line 38, in Claim 30, delete "polychlorotrifluoroethylene" and insert --polytetrafluoroethylene--, therefor.

Column 6, line 40, in Claim 31, delete "-1" and insert --1--, therefor.

Column 6, line 42, in Claim 31, delete "and/or" and insert --and--, therefor.

Column 6, line 55, in Claim 35, delete "polychlorotrifluoroethylene" and insert --polytetrafluoroethylene--, therefor.

Signed and Sealed this

Twenty-fourth Day of August, 2010

David J. Kappos
*Director of the United States Patent and Trademark Office*